United States Patent
Clawson et al.

(10) Patent No.: US 8,395,763 B2
(45) Date of Patent: Mar. 12, 2013

(54) METHOD OF TESTING A PASSIVE OPTICAL ELEMENT

(75) Inventors: Carl W. Clawson, Hillsboro, OR (US); Barry S. Gill, Vancouver, WA (US); Warren R. Hill, Portland, OR (US)

(73) Assignee: Photon Kinetics, Inc., Beaverton, OR (US)

( * ) Notice: Subject to any disclaimer, the term of this patent is extended or adjusted under 35 U.S.C. 154(b) by 225 days.

(21) Appl. No.: 12/882,798

(22) Filed: Sep. 15, 2010

(65) Prior Publication Data
US 2011/0063605 A1 Mar. 17, 2011

Related U.S. Application Data

(60) Provisional application No. 61/242,892, filed on Sep. 16, 2009.

(51) Int. Cl.
*G01N 21/00* (2006.01)
(52) U.S. Cl. ....................................... 356/73.1
(58) Field of Classification Search ............ None
See application file for complete search history.

(56) References Cited

U.S. PATENT DOCUMENTS

| | | | | |
|---|---|---|---|---|
| 4,629,316 A | * | 12/1986 | Shen et al. | 356/73.1 |
| 5,331,391 A | * | 7/1994 | Bukhshtab | 356/73.1 |
| 6,710,862 B1 | * | 3/2004 | Wilson et al. | 356/73.1 |
| 2008/0297773 A1 | * | 12/2008 | Blair et al. | 356/73.1 |

* cited by examiner

*Primary Examiner* — Tu Nguyen
(74) *Attorney, Agent, or Firm* — Chernoff Vilhauer McClung & Stenzel LLP

(57) ABSTRACT

A passive optical element defining an optical propagation path is tested by coupling a buffer fiber between an input of the propagation path and an optical time domain reflectometer. The OTDR launches optical radiation into the buffer fiber via one end thereof, measures power level of return light received at the OTDR via the buffer fiber, and creates an OTDR signature representing power level of return light as a function of distance from the end of the buffer fiber. The OTDR selects a first marker point by applying data reduction to a portion of a segment of the OTDR signature corresponding to the buffer fiber, selects a second marker point downstream of the input of the optical propagation path, and calculates a first power difference value as difference between a power level at the first marker point and a power level at the second marker point.

10 Claims, 2 Drawing Sheets

METHOD OF TESTING A PASSIVE OPTICAL ELEMENT

CROSS-REFERENCE TO RELATED APPLICATION

This application claims benefit of U.S. Provisional Application No. 61/242,892 filed Sep. 19, 2009, the entire disclosure of which is hereby incorporated herein by reference for all purposes.

BACKGROUND OF THE INVENTION

The subject matter disclosed herein relates to a method of testing a passive optical element, such as an optical fiber or an optical coupler.

Operators of data communication networks employing optical fiber cables require that the optical fibers forming the cables meet very strict requirements regarding change in optical power loss through the fibers under various mechanical stresses. The mechanical stresses may be applied by direct mechanical action, such as bending, twisting and crushing, or result from environmental effects, such as change in temperature. Testing to determine change in optical power loss of an optical fiber under change in mechanical stress due to environmental effects is referred to herein as enviro-mechanical testing whereas testing to determine change in optical power loss of an optical fiber under change in mechanical stress due to direct mechanical action is referred to herein as direct mechanical testing.

The current procedure for enviro-mechanical testing of optical fiber involves monitoring loss at one or more critical transmission wavelengths using a light source and power meter, applying a stress, and measuring the change in optical power loss resulting from the applied stress against relevant industry and/or end-user specifications. FIG. 1 shows one typical arrangement for performing a test to measure change in power loss. An optical fiber under test (FUT) 8 is placed in a suitable test fixture 10, which comprises an environmental stress chamber in which a controlled environmental stress may be applied to the FUT. The FUT has fiber pigtails that extend to the exterior of the stress chamber and are connected by fusion splices 12, jumpers 14, and optical connectors 16 to, respectively, a light source 18 and a power meter 20, which also are located outside the stress chamber.

The light source/power meter (LSPM) approach to measuring changes in loss is subject to disadvantage. For example, the real changes in loss of the FUT might be obscured by drift in the power output of the light source or drift in the response of the power meter over the duration of the test, and there may also be drift in loss of the optical connectors 16.

The test arrangement shown in FIG. 1 may be adapted to test several fibers substantially concurrently, such as a test sample of fibers in a multi-fiber cable, each connected to its own pair of jumpers 14, by providing optical switches 22 (shown in dashed lines) between the jumpers 14 and, respectively, the light source and power meter and controlling the switches 22 to select the fibers in turn. However, optical switches introduce another source of drift in power loss in the test channel (the optical path between the light source and the power meter).

Although drift in the source power and detector response can be monitored using a reference channel, the reference channel and the FUT cannot be monitored simultaneously. Further, in order to utilize a reference channel it would generally be necessary to interpose an optical switch between each jumper 14 and the adjacent optical connector 16 and drift in loss in the optical switches may impair the accuracy with which the change in power loss of the FUT can be measured.

Another arrangement that may be used for enviro-mechanical testing of an optical fiber is shown in FIG. 2. The fiber under test (FUT) has an upstream end, which is outside the stress chamber and is connected by a fusion splice 12 to the downstream end of a buffer fiber 26. The upstream end of the buffer fiber 26 is connected through a optical connector 30 to the port of an optical time domain reflectometer (OTDR) 34. The terms "upstream" and "downstream" are used herein relative to the direction of propagation of light from the port of the OTDR towards the FUT. The downstream end of the FUT is connected by a fusion splice 12 to the upstream end of a second buffer fiber 36.

In operation, the OTDR 34 acquires a data set that can be represented graphically as a trace showing power loss through the test channel (the optical path into which light is launched by the OTDR, and from which return light is received by the OTDR) as a function of distance. This trace, commonly referred to as a signature, may have the appearance shown in FIG. 3. Each segment of the signature corresponds to a segment of the test channel. In FIG. 3, the peak 40 originates from reflection in the optical connector 30, the peak 42 originates from a reflection at the glass-air interface at the far end of the buffer fiber 36, the substantially linear segments 44, 46 represent the power of return light received from the buffer fibers, and the steeper substantially linear segments 48, 50 represent power of return light received from the fusion splices. The operator places markers 52, 54 on the FUT and the OTDR measures the power loss in the segment between the markers. The measurements are not affected by loss drift in the elements, such as connectors and switches, outside the segment of the test channel that is between the markers. However, noise on the OTDR signature makes a two-point loss measurement of this type inherently noisy, injecting uncertainty into the measurement and possibly obscuring real changes in power loss.

Direct mechanical testing may be performed using an equipment arrangement that is schematically similar to that shown in FIG. 2. In the case of direct mechanical testing, however, the test fixture 10 applies stress to the FUT by direct mechanical action. Generally, the power loss is measured before the stress is applied and after the stress has been removed for a sufficient time to allow the FUT to recover.

Current standards for power loss change require a maximum loss change for 90% of the fibers in a fiber optic cable when placed under a specified stress of no greater than 0.05 dB. Current methods for measuring loss change have a precision no better than +/−0.05 dB. It is desirable that the minimum measurement error should be substantially less than the maximum permitted loss.

SUMMARY OF THE INVENTION

In accordance with the subject matter claimed herein there is provided a method of testing a passive optical element defining an optical propagation path, comprising coupling a first end of a first buffer fiber to an input of the optical propagation path and coupling a second end of the buffer fiber to an optical time domain reflectometer (OTDR), employing the OTDR to launch optical radiation into the first buffer fiber via the second end thereof, measure power level of return light received at the OTDR via the second end of the first buffer fiber, and create a first OTDR signature representing power level of return light as a function of distance from the second end of the first buffer fiber, selecting a first marker point by applying data reduction to at least a portion of a segment of the first OTDR signature corresponding to the first buffer fiber, selecting a second marker point downstream of the input of the optical propagation path, and calculating a first power difference value as difference between a power level at the first marker point and a power level at the second marker point.

BRIEF DESCRIPTION OF THE DRAWINGS

For a better understanding of the invention, and to show how the same may be carried into effect, reference will now be made, by way of example, to the accompanying drawings, in which.

DETAILED DESCRIPTION

Figure 1:
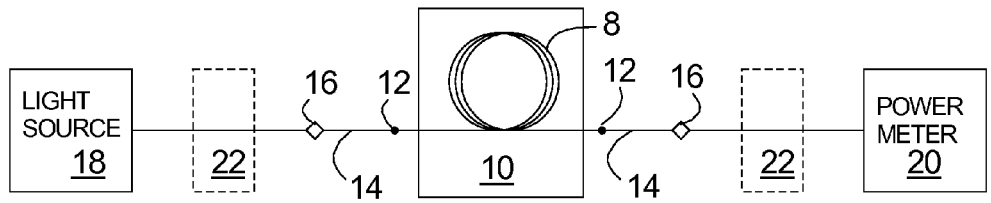
FIG. 1 illustrates schematically a first equipment arrangement for measuring optical power loss in an optical fiber.
Figure 2:
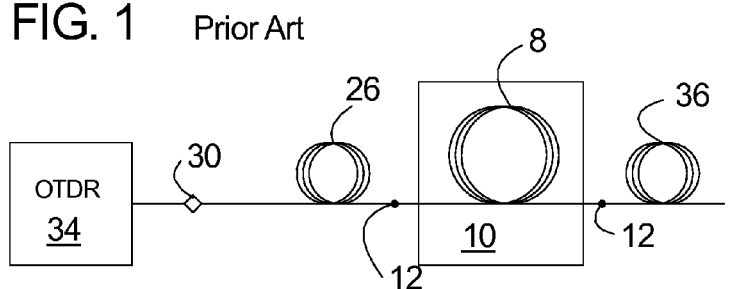
FIG. 2 illustrates schematically a second equipment arrangement for enviro-mechanical testing of an optical fiber.
Figure 3:
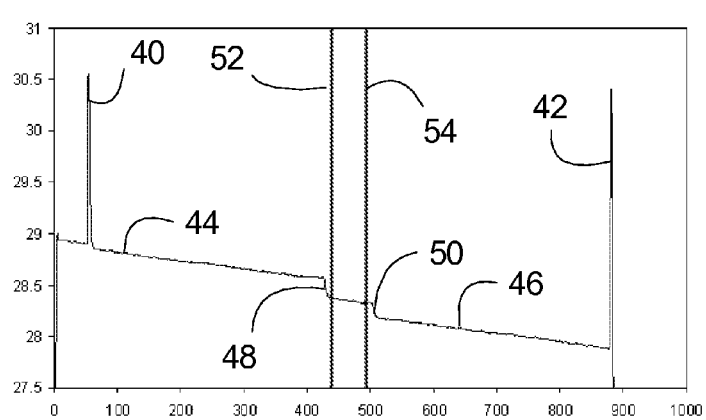
FIG. 3 illustrates a graph that is useful for explaining one method for using the equipment arrangement shown in FIG. 2.

The arrangement shown in FIG. 2 may be used to perform an alternative method for measuring power loss with a substantially higher precision than the method described with reference to the signature shown in FIG. 3.

Figure 4:
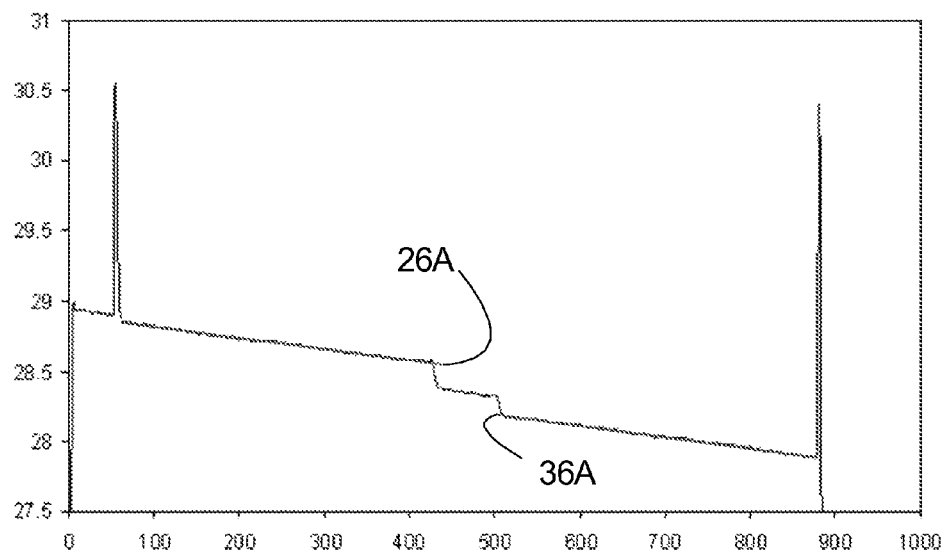
FIG. 4 illustrates a second graph that is useful for explaining a second method for using the equipment arrangement shown in FIG. 2.
Figure 5:
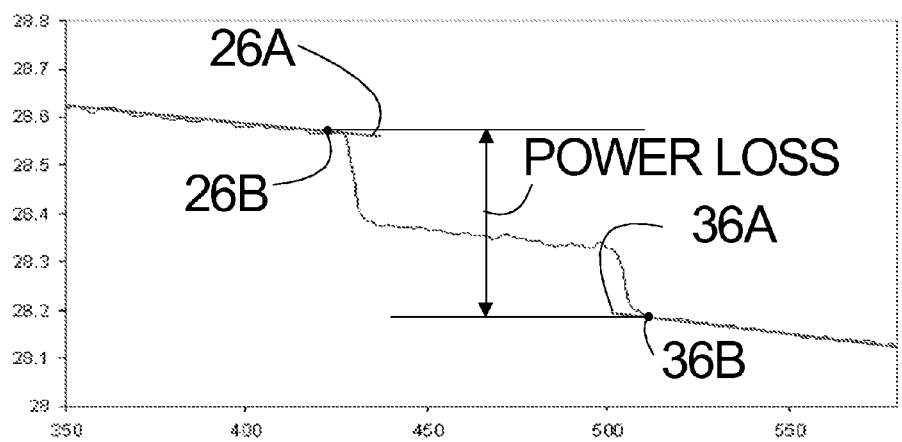
FIG. 5 is an enlarged view of a portion of the graph shown in FIG. 4.

Referring to FIG. 4, the OTDR is able to use conventional signal processing techniques to distinguish the segments of the signature corresponding to the two buffer fibers 26, 36 from other portions of the signature and to determine a power level associated with each buffer fiber by applying data reduction to a sufficiently complete amount of the information contained in the segments of the signature corresponding to the two buffer fibers. In a practical implementation of the alternative method, the data reduction is achieved by fitting two straight lines 26A, 36A to the buffer fiber segments respectively using a least squares approximation algorithm. Referring to FIG. 5, the OTDR then selects a first data point 26B on the fit line 26A corresponding to a point on the buffer fiber 26 that is close to the fusion splice 12. For example, a data point that corresponds to a point on the buffer fiber that is one meter closer to the distal end of the buffer fiber than a point on the signature where the power differs by a predetermined amount from the power of the fit line (indicating that the latter point corresponds to a point on the fusion splice), may be selected as the first data point. The OTDR selects a second data point 36B on the fit line 36A in similar fashion and measures the power loss between the two selected data points.

The test fixture 10 is then used to apply a stress to the FUT and the OTDR acquires a second signature while the FUT is under stress (in the case of an enviro-mechanical test) or after the stress has been removed (in the case of a direct mechanical test).

The OTDR repeats the analysis and fits straight lines to the two buffer fiber segments of the second signature. The OTDR verifies that the two fit lines of the second signature have the same respective slopes as the corresponding fit lines of the first signature. If the fit lines do not have the same slope, it implies a change in one or both of the buffer fibers, which would invalidate the test. Assuming that the fit lines have the proper slopes, the OTDR selects two data points on the second pair of fit lines corresponding to points on the test channel at the same respective distances from the OTDR as the points that correspond to the selected data points of the first signature and measures power loss between the two data points of the second signature.

By using points on the fit lines to define the power levels that are measured, the effect on the power loss measurement of noise present on the OTDR signature is substantially reduced. Measurements performed using the method described with reference to FIGS. 4 and 5 show variations in measurement precision of less than 0.003 dB over several weeks of observation.

The power loss measurements includes power loss in the fusion splices but since the fusion splices are outside the test fixture, the losses in the fusion splices are not affected by conditions inside the test fixture and any change in loss is caused by the applied stress. As in the case of the method described with reference to the signature shown in FIG. 3, the OTDR calculates the change in power loss due to the stress by subtracting the first power loss measurement from the second power loss measurement.

Figure 6:
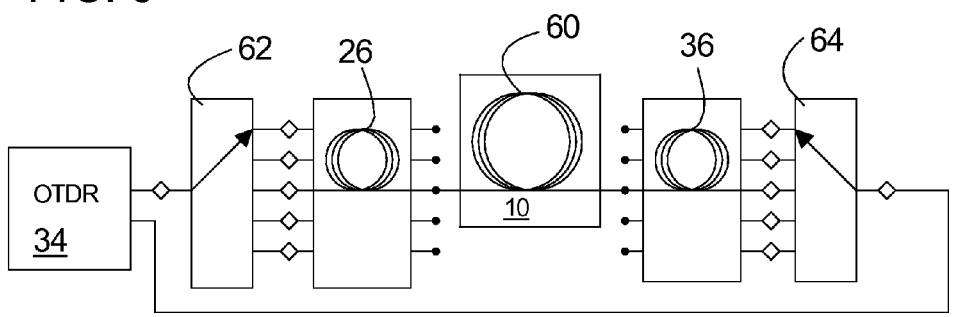
FIG. 6 illustrates schematically a modification of the equipment arrangement shown in FIG. 2.

In order to test adequately a fiber optic cable containing multiple optical fibers, it may be necessary to test all of the fibers or a representative sample of the fibers, depending on the number of fibers in the cable. In a development of the method described with reference to FIGS. 4 and 5, it is possible to test multiple fibers substantially concurrently using the apparatus shown in FIG. 6. In this case, a medial length segment of the fiber optic cable 60 is placed in the test fixture 10 while the two opposite end segments of the cable remain outside the test fixture, so that each fiber to be tested has two pigtails outside the test fixture. Each fiber to be tested is connected by its upstream and downstream pigtails to its own upstream and downstream buffer fibers (for clarity, only one FUT and one pair of upstream and downstream buffers are shown in FIG. 6) by fusion splices. The distal end of each upstream buffer fiber 26 is connected by an optical connector to a downstream port of an optical switch 62. The optical switch 62 has one upstream port and multiple downstream ports and is operative to connect the upstream port to the downstream ports selectively. The port of the OTDR is connected to the upstream port of the optical switch 62 by a fusion splice.

Using the apparatus shown in FIG. 6, as described thus far, the OTDR first tests all the fibers with the cable in an unstressed condition, by acquiring and analyzing the signature of each test channel in turn, by selecting the test channels sequentially using the optical switch. The test fixture is then used to apply a stress to the cable and the OTDR repeats the operation, either while the cable is under stress (in the case of an enviro-mechanical test) or after the stress has been removed (in the case of a direct mechanical test). The OTDR is therefore able to measure the change in loss of each fiber to be tested.

FIG. 6 also illustrates that a two-port OTDR may be used to test the fibers from each end. In this case, a second optical switch 64 is needed in order to allow the OTDR to launch optical radiation into the fibers under test in turn via the respective buffer fibers 36.

In accordance with another modification of the method described with reference to FIGS. 4 and 5, the downstream buffer is omitted and the downstream data point is a point on the FUT. In this case the downstream data point may be selected by applying data reduction to a segment of the FUT although it would be possible to select the downstream data point based only on distance from an end of the FUT. Generally, it will be desirable for the downstream data point to be distant from the upstream data point, but it is not necessary that the downstream data point be outside the test fixture 10. It will be understood that measurement precision is reduced relative to the method described with reference to FIGS. 4 and 5, but the setup time and measurement time may be reduced, and the equipment cost may be reduced.

The method described with reference to FIGS. 4 and 5 is applicable to testing not only optical fibers but also other passive optical elements such as couplers, wavelength division multiplexers and connectors. However, when testing an optical element having an optical path less than about 70 m in length (depending on the particular OTDR that is used to acquire the data set) it will not normally be satisfactory to omit the downstream buffer, as discussed above in the case of testing a fiber.

The operating wavelength of a laser diode used in an OTDR depends on temperature, and power loss in an optical fiber depends on wavelength. Therefore, it is desirable to avoid changes in temperature during the test.

It may take several hours to complete a variety of tests on a cable containing multiple fibers and during that time the temperature in a typical test laboratory may change by an amount such that the operating wavelength of many OTDRs may change significantly. It is therefore desirable to employ an OTDR that is stable under change in ambient temperature, since this may be more reliable and less expensive than controlling the ambient temperature in the test laboratory. The Photon Kinetics 8000 OTDR has been found particularly suitable.

Generally, the length of the (or each) buffer fiber should be at least 100 m in order to provide a sufficient number of data points for fitting a line to the signature segment corresponding to the buffer fiber, where the line will not be influenced to an undesirable degree by noise on the signature.

As suggested above, fitting a straight line to the signature segment corresponding to a buffer fiber is not the only method by which data reduction may be applied to determine a power level associated with the buffer fiber. Other possible data reduction techniques include simply averaging over the segment corresponding to the buffer fiber (or over a portion of the segment corresponding to the buffer fiber). Also, in the event that the data reduction involves fitting a line to the signature segments, other approaches than least squares may be employed.

It will be appreciated that the invention is not restricted to the particular embodiment that has been described, and that variations may be made therein without departing from the scope of the invention as defined in the appended claims, as interpreted in accordance with principles of prevailing law, including the doctrine of equivalents or any other principle that enlarges the enforceable scope of a claim beyond its literal scope. Unless the context indicates otherwise, a reference in a claim to the number of instances of an element, be it a reference to one instance or more than one instance, requires at least the stated number of instances of the element but is not intended to exclude from the scope of the claim a structure or method having more instances of that element than stated. The word "comprise" or a derivative thereof, when used in a claim, is used in a nonexclusive sense that is not intended to exclude the presence of other elements or steps in a claimed structure or method.

The invention claimed is:

1. A method of measuring change in power loss in a passive optical element defining an optical propagation path, comprising:
   a. coupling a first end of a first buffer fiber to an input of the optical propagation path, coupling a second end of the first buffer fiber to an optical time domain reflectometer (OTDR), and coupling a first end of a second buffer fiber to an output of the optical propagation path,
   b. employing the OTDR to launch optical radiation into the first buffer fiber via the second end thereof, measure power level of return light received at the OTDR via the second end of the first buffer fiber, and create a first OTDR signature representing power level of return light as a function of distance from the second end of the first buffer fiber,
   c. selecting a first marker point by applying data reduction to at least a portion of a segment of the first OTDR signature corresponding to the first buffer fiber,
   d. selecting a second marker point downstream of the output of the optical propagation by applying data reduction to at least a portion of a segment of the first OTDR signature corresponding to the second buffer fiber,
   e. calculating a first power difference value as difference between a power level at the first marker point and a power level at the second marker point,
   f. subsequent to step b., employing the OTDR to launch optical radiation into the first buffer fiber via the second end thereof, measure power level of return light received at the OTDR via the second end of the first buffer fiber, and create a second OTDR signature representing power level of return light as a function of distance from the second end of the first buffer fiber,
   g. selecting a third marker point by applying data reduction to at least a portion of the segment of the second OTDR signature corresponding to the first buffer fiber, the third marker point being at substantially the same location as the first marker point,
   h. selecting a fourth marker point by applying data reduction to at least a portion of a segment of the second OTDR signature, the fourth marker point being at substantially the same location as the second marker point,
   i. calculating a second power difference value as difference between a power level at the third marker point and a power level at the fourth marker point, and
   j. subtracting one of the first and second power difference values from the other power difference value.

2. A method according to claim 1, comprising applying a stress to the optical element between step b. and step f. and performing step f. while the optical element is under stress.

3. A method according to claim 1, comprising applying a stress to the optical element between step b. and step f. and removing the stress prior to step f.

4. A method according to claim 1, wherein step c. comprises fitting a first straight line segment to said portion of said segment of the first OTDR signature corresponding to the first buffer fiber and selecting said first marker point as a point on said first straight line segment, step d. comprises fitting a second straight line segment to said portion of said segment of the first OTDR signature corresponding to the second buffer fiber and selecting said second marker point as a point on said second straight line segment, and step e. comprises measuring difference between the power level of the first straight line segment at the first marker point and the power level of the second straight line segment at the second marker point.

5. A method of measuring change in power loss in a passive optical element defining an optical propagation path, comprising:
   a. coupling a first end of a buffer fiber to an input of the optical propagation path and, coupling a second end of the buffer fiber to an optical time domain reflectometer (OTDR),
   b. employing the OTDR to launch optical radiation into the buffer fiber via the second end thereof, measure power level of return light received at the OTDR via the second end of the buffer fiber, and create a first OTDR signature representing power level of return light as a function of distance from the second end of the buffer fiber,
   c. selecting a first marker point by applying data reduction to at least a portion of a segment of the first OTDR signature corresponding to the buffer fiber,
   d. selecting a second marker point downstream of the input of the optical propagation path,
   e. calculating a first power difference value as difference between a power level at the first marker point and a power level at the second marker point,
   f. subsequent to step b., employing the OTDR to launch optical radiation into the first buffer fiber via the second end thereof, measure power level of return light received at the OTDR via the second end of the buffer fiber, and create a second OTDR signature representing power level of return light as a function of distance from the second end of the buffer fiber,
   g. selecting a third marker point by applying data reduction to at least a portion of a segment of the second OTDR signature corresponding to the buffer fiber, the third marker point being at substantially the same location as the first marker point,
   h. selecting a fourth marker point at substantially the same location as the second marker point,
   i. calculating a second power difference value as difference between a power level at the third marker point and a power level at the fourth marker point, and
   j. subtracting one of the first and second power difference values from the other power difference value.

6. A method according to claim 5, comprising applying a stress to the optical element between step b. and step f. and performing step f. while the optical element is under stress.

7. A method according to claim 5, comprising applying a stress to the optical element between step b. and step f. and removing the stress prior to step f.

8. A method according to claim 5, wherein the second marker point is a point on said optical propagation path.

9. A method according to claim 8, wherein the passive optical element is an optical fiber and step d. comprises applying data reduction to at least a portion of a segment of the first OTDR signature corresponding to the optical fiber.

10. A method according to claim 5, wherein step c. comprises fitting a first straight line segment to said portion of said segment of the first OTDR signature corresponding to the buffer fiber and selecting said first marker point as a point on said first straight line segment, and step g. comprises fitting a second straight line segment to said portion of said segment of the first OTDR signature corresponding to the buffer fiber and selecting said third marker point as a point on said second straight line segment.

* * * * *